United States Patent
Dobson et al.

(10) Patent No.: US 6,766,386 B2
(45) Date of Patent: Jul. 20, 2004

(54) METHOD AND INTERFACE FOR IMPROVED EFFICIENCY IN PERFORMING BUS-TO-BUS READ DATA TRANSFERS

(75) Inventors: William Gordon Keith Dobson, Ball Ground, GA (US); Joel Danzig, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 324 days.

(21) Appl. No.: 09/939,800

(22) Filed: Aug. 28, 2001

(65) Prior Publication Data

US 2003/0046473 A1 Mar. 6, 2003

(51) Int. Cl.[7] .................................................. G06F 3/00
(52) U.S. Cl. .............................. 710/39; 710/7; 710/112; 709/238; 712/225
(58) Field of Search ............................... 710/7, 15, 31, 710/33, 36, 39, 107, 112, 129, 127, 20; 712/225; 709/238; 711/167

(56) References Cited

U.S. PATENT DOCUMENTS

| | | | | |
|---|---|---|---|---|
| 5,535,345 A | * | 7/1996 | Fisch et al. | 710/129 |
| 5,949,981 A | * | 9/1999 | Childers | 710/127 |
| 6,098,134 A | * | 8/2000 | Michels et al. | 710/108 |
| 6,243,778 B1 | * | 6/2001 | Fung et al. | 710/113 |
| 6,266,723 B1 | * | 7/2001 | Ghodrat et al. | 710/100 |
| 6,366,989 B1 | * | 4/2002 | Keskar et al. | 711/167 |
| 6,370,585 B1 | * | 4/2002 | Hagersten et al. | 709/238 |

\* cited by examiner

*Primary Examiner*—Rehana Perveen
*Assistant Examiner*—Rijue Mai
(74) *Attorney, Agent, or Firm*—Sterne Kessler Goldstein & Fox P.L.L.C.

(57) ABSTRACT

A novel method and interface is provided for conducting read data transfers between an initiator device on a single-transaction bus and a target device on a split-transaction bus. Embodiments of the present invention permit the initiator device to "post" a read request for a specified amount of data from a specified address on the split-transaction bus to an interface that resides between the single-transaction bus and the split-transaction bus. The requested read data is then retrieved over the split-transaction bus and presented in a high-speed memory within the interface for direct access by the initiator device over the single-transaction bus. Latency is avoided because the initiator device is not required to wait for the emergence of the requested read data from the split-transaction bus but, instead, may continue to perform other activities on the single-transaction bus and then obtain the requested read data at a later time.

30 Claims, 8 Drawing Sheets

METHOD AND INTERFACE FOR IMPROVED EFFICIENCY IN PERFORMING BUS-TO-BUS READ DATA TRANSFERS

BACKGROUND OF THE INVENTION

1. Field of the Invention

The field of the present invention generally pertains to the transfer of digital information in a computer system and, more particularly, to the transfer of digital information between buses in a computer system.

2. Background

The term "bus," as used herein, generally refers to a set of hardwire lines, or conductors, used for transferring digital information among the components of a computer system. A bus may be used, for example, to transfer digital information between chips, expansion boards, and processor/memory subsystems within a computer system. A bus transaction typically involves an initiator device (the bus master), and a target device (the bus slave), each of which are interfaced to the bus. The initiator device initiates a transaction by sending command and address information over the bus to the target device, which services the transaction. For example, in a system where the initiator device is a host processor and the target device is a memory, the host processor may initiate bus transactions to read data from or write data to the target memory.

Bus transactions may be executed in a "single-transaction" mode or a "split-transaction" mode. In a single-transaction mode, the initiator device must remain committed to a given transaction until the transaction has fully completed. Consequently, an initiator device performing a write on a single-transaction bus cannot perform further transactions on the bus until the designated target device has accepted the write data. Similarly, an initiator device performing a read on a single-transaction bus cannot perform further transactions on the bus until the designated target device has returned the requested read data. In contrast, in a split-transaction mode, each bus transaction is split into two largely independent parts: a request that is issued by the initiator device and a reply that is issued by the target device. As a result, an initiator device operating on a split-transaction bus is free to perform other transactions on the bus after issuing a request, even though a reply has not yet been received from the designated target device.

The PCI bus, as defined by the PCI Local Bus Specification Rev. 2.2 (published by the PCI Special Interest Group), is an example of a bus architecture that utilizes a single-transaction method of operation. In accordance with PCI bus protocols, when a target device requires an extended period of time to respond to a transaction, it may suspend the transaction so that the PCI bus can be used by other devices to perform other transfer operations in the interim. The suspension of the transaction by the target is termed a "disconnect." Because the PCI bus is a single-transaction bus, the initiator device will continue to "retry" the transaction in response to the disconnect until such time as the transaction may complete.

Where the initiator device is the bridge between a CPU or other host device and the PCI bus, the inability of the initiator device to make further PCI bus accesses until the transaction has completed can result in a degradation of system bandwidth. To address this issue, conventional PCI bus bridges offer the ability to post, or queue, write operations from the initiator device, thus permitting a host CPU to issue writes and then continue on to issue other bus transactions without delay. Unfortunately, the read path is not amenable to such a solution. If the desired data from the target device is not read-cacheable, as in the case of data from real-time status registers or read-modified memories such as FIFOs, the host must wait for the read data to be produced by the target device before it can perform further transactions on the PCI bus. As a result, a target device that is slow to respond to PCI reads will essentially force the CPU to wait while the host-PCI bus bridge retries the read until it completes.

When bridging a single transaction bus, such as the PCI bus, to a split-transaction bus, the latency for producing read data can be substantial since a request for read data must be sent and a response received on the split-transaction bus before the read data can be presented to the PCI side of the bridge. This latency equates directly to a loss of CPU bandwidth when a host CPU on the PCI bus is attempting to read registers or other memories on the split-transaction bus that store non-cacheable data.

This concept may be illustrated in reference to FIG. 1, which depicts a conventional single-transaction to split-transaction bus bridge application 100. As shown in FIG. 1, a host CPU 102 resides on a single-transaction bus 104 and a set of registers 106 resides on a split-transaction bus 108. The single-transaction bus 104 is interfaced to the split-transaction bus 108 via the conventional bus bridge 110. The conventional bus bridge 110 includes a bridge control state machine 114 that provides the necessary handshaking functionality between the single-transaction bus 104 and the split-transaction bus 108, and a read FIFO 112 for the temporary buffering of requested read data retrieved from the split-transaction bus 108 for immediate transfer over the single-transaction bus 104.

FIG. 2 depicts the potential latencies involved when the host CPU 102 of FIG. 1 performs a direct read access to the bus bridge 110 to obtain data from the registers 106. In particular, FIG. 2 shows potential bus activity on the single transaction bus 104 and the split-transaction bus 108 during such an access. As shown in FIG. 2, after the host CPU 102 initiates a read to the bus bridge 110 at block 202a, the bus bridge 110 responds by issuing a read request on the split-transaction bus 108, shown in block 206. Because the bus bridge 110 must wait to receive a read response from the registers 106, the bus bridge 110 eventually issues a disconnect to the host CPU 102. In response to the disconnect, the host CPU 102 will continue issuing reads to the bus bridge 110 in accordance with a single-transaction mode of operation. If the time required for the bus bridge 110 to receive a read response from the registers 106 is long, the host CPU 102 may receive numerous disconnects. These attempted reads and disconnects are denoted as blocks 202a through 202n in FIG. 2. Eventually, the bus bridge 110 receives a read response from the registers 106, as shown in block 208, and the requested data is transferred from the registers 106 to the read FIFO 112 in the bus bridge 110. Because the data is now available in the bus bridge 110, the data will be transferred from the bus bridge 100 to the host CPU 102 during the next attempted read by the host CPU 102 and the read will complete, as shown in block 204.

The total latency for this example read data transfer is equal to the time periods d1+d2+d3 denoted in FIG. 2. The time period d1 corresponds to the latency involved in issuing the read request on the split-transaction bus 108. The time period d2 is the latency involved in receiving a response and read data from the registers 106 over the split-transaction bus 108. Finally, the time period d3 is the latency between the time that the bus bridge 110 receives the response and read data from the registers 106 and the time that the host CPU 102 retries the read access and the read completes.

As illustrated by FIG. 2, the time period d2 represents the largest portion of the total latency and is roughly equal to the amount of CPU processing time wasted waiting for the read data to emerge. This waste of bandwidth becomes significant in applications where a memory on the split-transaction bus is read repeatedly and often by a host CPU. An example of this may be found in a cable modem termination system (CMTS) line card application in which a host processor is coupled via a PCI bus to a BCM3212 CMTS MAC integrated circuit (IC) manufactured by Broadcom Corporation of Irvine, Calif. In such an application, it is contemplated that the host processor will issue thousands of reads per second to obtain statistical MIB (Management Information Base) data from memory devices residing on the internal split-transaction bus of the CMTS MAC IC.

What is desired then, is a method and interface for improving the efficiency of read data transfers between an initiator device on a single-transaction bus and a target device on a split-transaction bus. In particular, the desired method and interface should avoid the latency due to disconnects and retries that occur in a conventional single-transaction to split-transaction bus bridge application.

BRIEF SUMMARY OF THE INVENTION

The present invention provides a novel method and interface for conducting read data transfers between an initiator device on a single-transaction bus, such as a PCI bus, and a target device on a split-transaction bus. In embodiments, the interface includes a command register, read request generation logic, read response routing logic, and a read data memory. The initiator device writes a read command to the command register over the single-transaction bus. In response to the writing of the read command, the read request generation logic generates a read request and issues it over the split-transaction bus. The read response routing logic receives a response to the read request from the target device over the split-transaction bus and routes read data associated with the response to the read data memory for storage purposes. The read data stored in the read data memory is then read accessible to the initiator device over the single-transaction bus.

In embodiments, the command information specifies a quantity of requested data words and the request generated by the read request generation logic includes the specified quantity of requested data words.

In further embodiments, the interface also includes an address register that is written to by the initiator device over the single transaction bus, and the read request generated by the read request generation logic includes address information written to the address register by the initiator device.

In still further embodiments, the read request generated by the read request generation logic includes a unique source identifier assigned by the read request generation logic. The unique source identifier is also included in the response to the read request and is used by the read response routing logic to route the read data associated with the response to the read data memory.

In alternate embodiments, the read data memory comprises a random access memory.

In other alternate embodiments, the interface also includes write control logic that receives the read data associated with the response from the read response routing logic and, for each of one or more data words within the read data, generates a value corresponding to an address in the read data memory and stores the data word at that address in the read data memory. The write control logic may also write status information to a status register within the interface that indicates that the read data associated with the response is available in the read data memory. Additionally, the write control logic may transmit an interrupt signal over an interrupt line within the interface in response to receiving the read data associated with the response, the interrupt signal for alerting the initiator device that the read data associated with the response is available in the read data memory.

The invention is advantageous in that it improves the efficiency of read data transfers between an initiator device on a single-transaction bus and a target device on a split-transaction bus. In particular, embodiments of the present invention avoid the latency due to disconnects and retries that occur in a conventional single-transaction to split-transaction bus bridge application.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/ FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
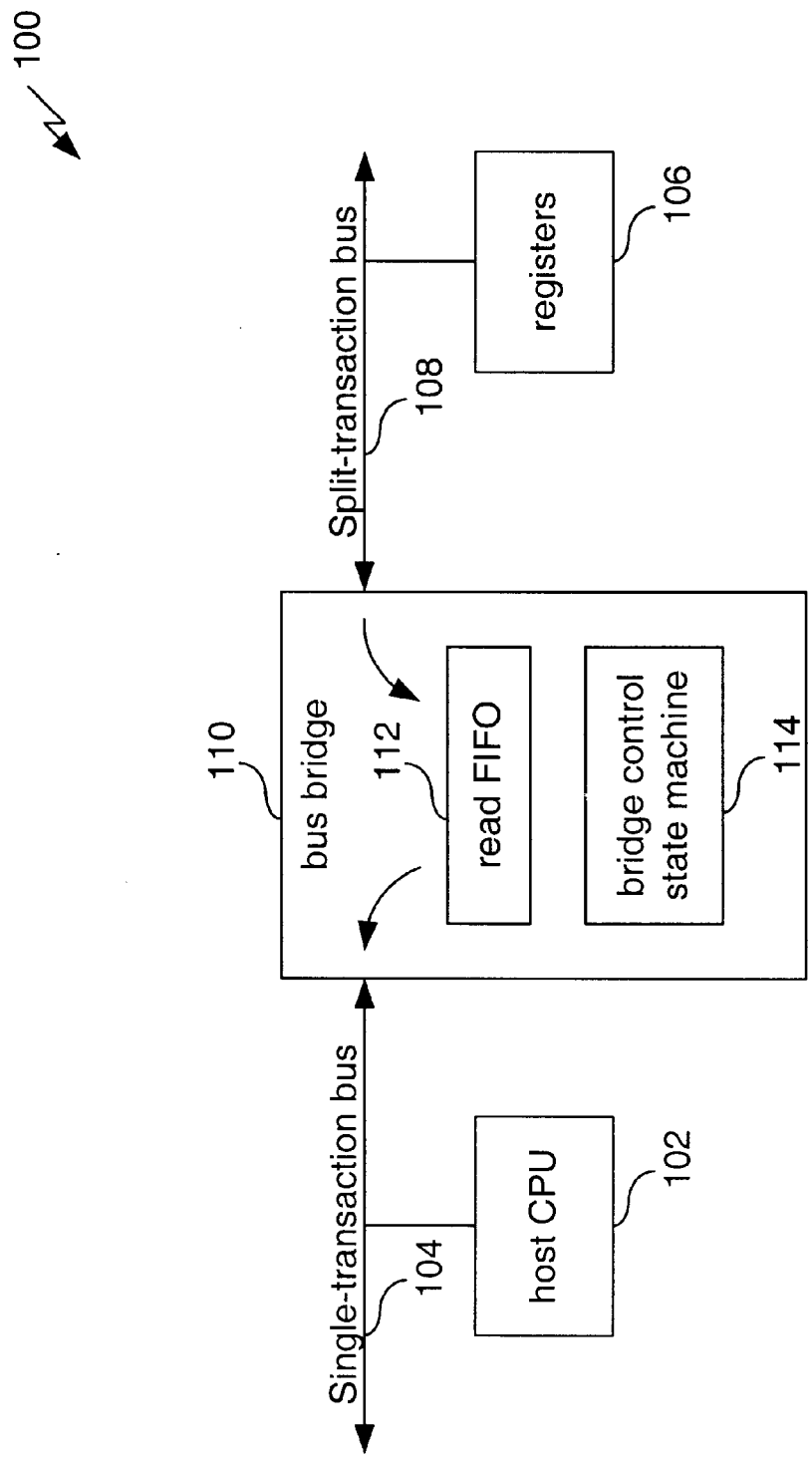
FIG. 1 is a depiction of a conventional single-transaction to split-transaction bus bridge application.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Introduction

B. Example Single-Transaction to Split-Transaction Bus Bridge Application in Accordance with Embodiments of the Present Invention C. Single-Transaction to Split-Transaction Bus Interface in Accordance with Embodiments of the Present Invention D. Method for Executing Read Transactions in Accordance with Embodiments of the Present Invention E. Conclusion

A. Introduction

Embodiments of the present invention utilize a novel method and interface for conducting read data transfers between an initiator device on a single-transaction bus and a target device on a split-transaction bus. In particular, embodiments of the present invention permit the initiator device to "post" a read request for a specified amount of data from a specified address on the split-transaction bus to an interface that resides between the single-transaction bus and the split-transaction bus. The requested read data is then retrieved over the split-transaction bus and presented in a high-speed memory within the interface for direct access by the initiator device over the single-transaction bus. Latency is avoided because the initiator device is not required to wait for the emergence of the requested read data from the split-transaction bus but, instead, may continue to perform other activities on the single-transaction bus and then obtain the requested read data at a later time. The ability of the initiator device to perform other bus operations before the completion of the read is due to the fact that the "posting" of reads actually entails performing write operations over the single-transaction bus.

Figure 3:
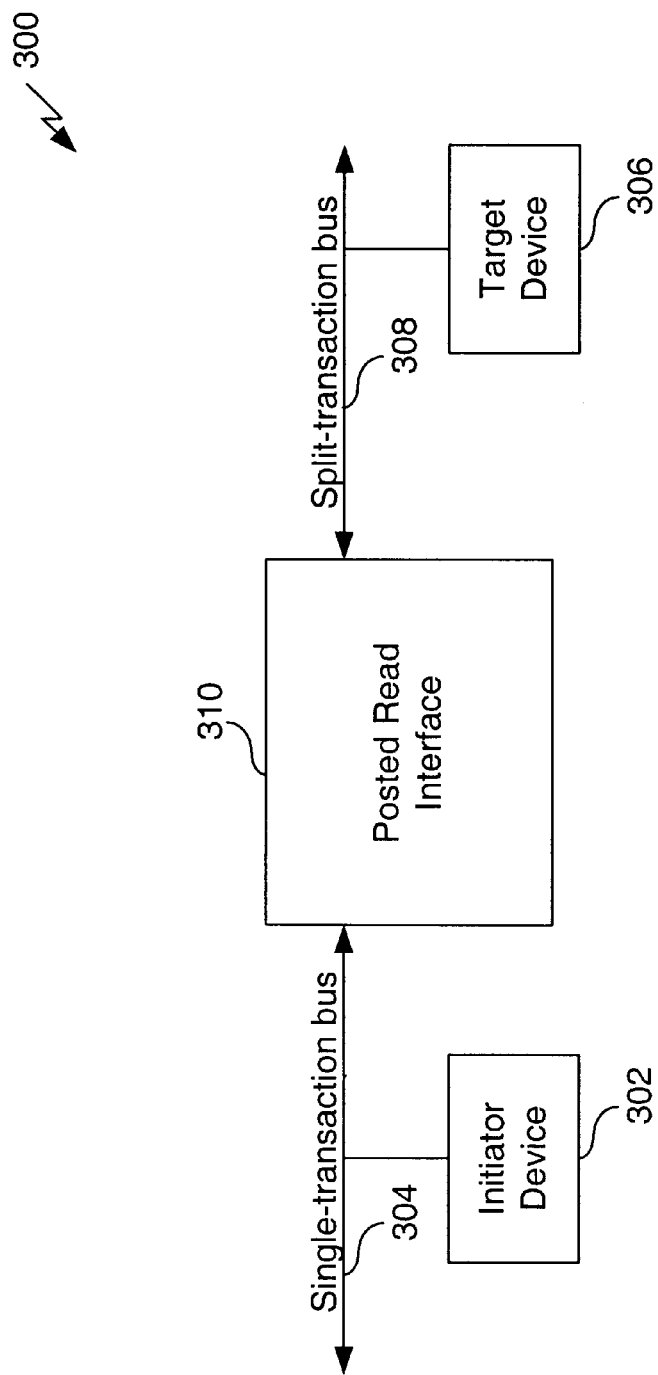
FIG. 3 depicts a single-transaction to split-transaction bus bridge application in accordance with embodiments of the present invention.

B. Example Single-Transaction to Split-Transaction Bus Bridge Application in Accordance with Embodiments of the Present Invention FIG. 3 depicts an example single-transaction to split-transaction bus bridge application 300 in accordance with embodiments of the present invention. The example application 300 includes an initiator device 302 interfaced to a single transaction bus 304 and a target device 306 interfaced to a split-transaction bus 308. In embodiments, the initiator device 302 comprises a bridge between a host CPU and the single-transaction bus 304 and the target device 306 comprises a set of registers or other memory that stores data of interest to the host CPU. As will be described in more detail herein, the posted read interface 310 is a bridge between the single-transaction bus 304 and the split-transaction bus 308 that facilitates read data transfers between the target device 306 and the initiator device 302 in accordance with embodiments of the present invention.

In embodiments, the single-transaction bus 304 comprises a PCI bus, as defined by the PCI Local Bus Specification Rev. 2.2. However, the invention is not so limited and the single-transaction bus 304 may be any bus that operates in a single-transaction mode. In further embodiments, the split-transaction bus 304 is a proprietary split-transaction bus internal to an integrated circuit device, such as the BCM3212 CMTS MAC IC manufactured by Broadcom Corporation of Irvine, Calif. Alternately, the split-transaction bus 304 may be a PCI-X bus, as defined by the PCI-X Bus Specification Rev 1.0 (published by PCI-SIG), that is operating in a split-transaction mode. However, the invention is not so limited, and the split-transaction bus 304 may be any bus that operates in a split-transaction mode.

Figure 4:
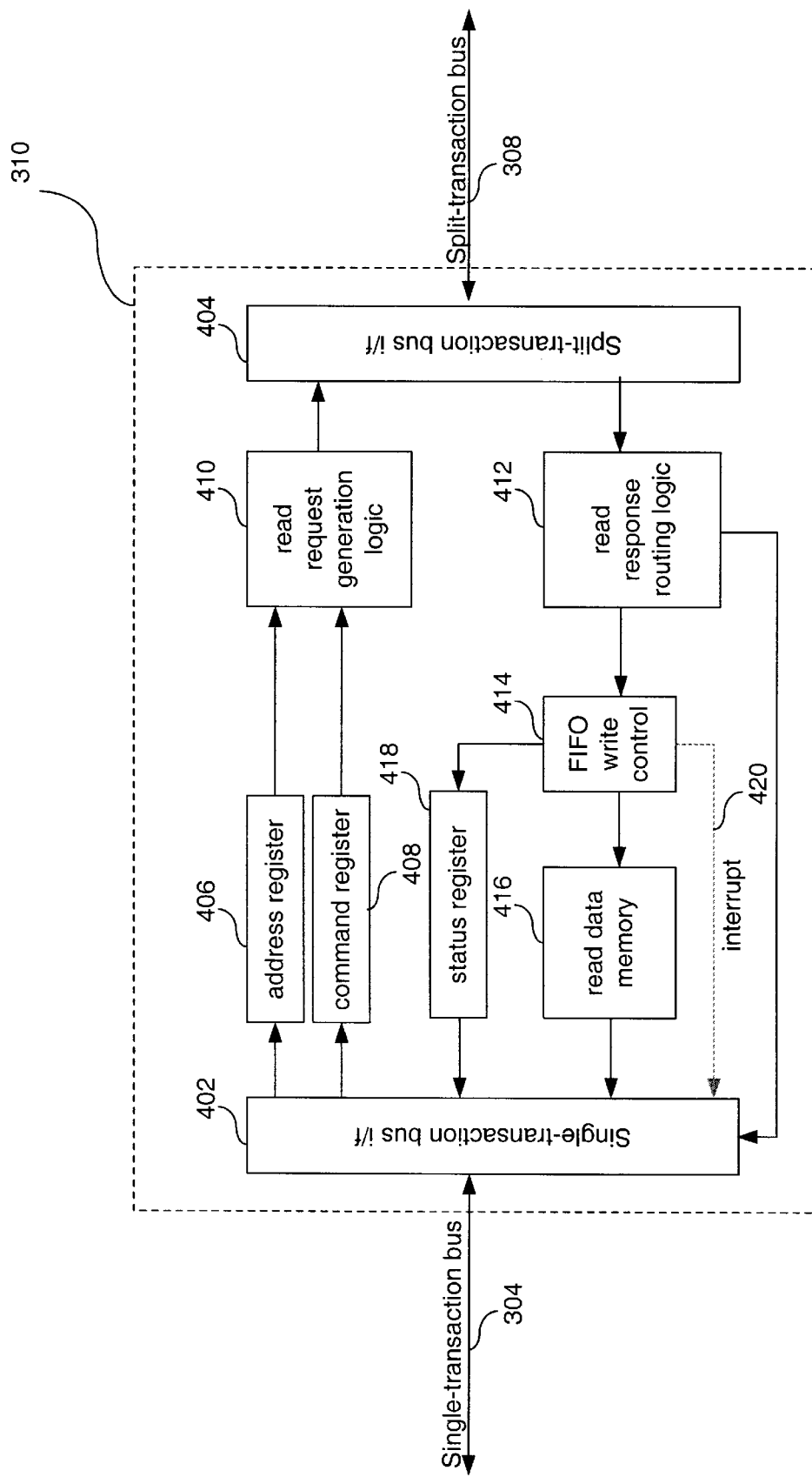
FIG. 4 depicts an interface between a split-transaction bus and a single-transaction bus in accordance with embodiments of the present invention.

C. Single-Transaction to Split-Transaction Bus Interface in Accordance with Embodiments of the Present Invention FIG. 4 illustrates the posted read interface 310 of FIG. 3 in more detail. The posted read interface 310 is utilized to conduct read data transfers between the single-transaction bus 304 and the split-transaction bus 308 in accordance with embodiments of the present invention. The posted read interface 310 includes a single-transaction bus interface 402, a split-transaction bus interface 404, an address register 406, a command register 408, a status register 418, read request generation logic 410, read response routing logic 412, a FIFO write control 414, a read data memory 416, and an optional interrupt line 420. Each of these components will now be briefly described.

The single-transaction bus interface 402 comprises a standard interface for transferring address, command and data information to and from the single-transaction bus 304. In particular, the single-transaction bus interface 402 decodes address information on the single-transaction bus 304 and, when appropriate, passes write information from the single-transaction bus 304 to the address register 406 and the command register 408. The single-transaction bus interface 402 also provides a read path between the single-transaction bus 304 and the read data memory 416, the status register 418 and, optionally, the address register 406 and the command register 408. In embodiments where the single transaction bus 304 comprises a PCI bus, the single-transaction bus interface 402 comprises a standard PCI bus interface.

The split-transaction bus interface 308 comprises an interface for transferring address, command and data information to and from the split-transaction bus 308. In particular, the split-transaction bus interface 308 provides a path for issuing read requests from the read request generation logic 410 to the split-transaction bus 308 and a path for transferring read responses and associated read data from the split-transaction bus 308 to the read response routing logic 412.

The address register 406, the command register 408, and the status register 418 each comprise a high-speed register for temporarily storing address, command and status information, respectively. In alternate embodiments, the command register 406 and the status register 418 comprise the same physical register, with the register appearing as a command register on the write path from the single-transaction bus 304 and as a status register on the read path from the single-transaction bus 304. In still further embodiments, the address register 406, the command register 408, and the status register 418 may each comprise unique storage locations in a single high-speed memory device, such as, but not limited to, a random access memory (RAM).

The read request generation logic 410 comprises circuitry that generates and issues read requests via the split-transaction bus interface 404 to the split-transaction bus 308 in response to the loading of command information into the command register 408. The operation of the read request generation logic 410 will be described in more detail herein.

The read response routing logic 412 comprises circuitry that receives read responses and associated read data from the split-transaction bus 308 via the split-transaction bus interface 404 and routes it to either the FIFO write control 414 or directly to the single-transaction bus interface 402. The operation of the read response routing logic 412 will be described in more detail herein.

The FIFO write control 414 is logic that receives read data associated with read responses received by the read response routing logic 412 and generates addresses for writing the read data to the read data memory 416 in a first-in-first-out fashion. The optional interrupt line 420 permits the FIFO write control 414 to send an interrupt signal over the single-transaction bus in response to the receipt of the read data.

The read data memory 416 is a high-speed memory device that stores read data associated with read responses received by the read response routing logic 412. The read data memory 416 appears as a window of local memory that may be directly accessed by devices on the single-transaction bus 304. In embodiments, the read data memory 416 comprises a high-speed dual port RAM device. However, the invention is not so limited, and the read data memory 416 may be any type of high-speed memory device for storing read data. In further embodiments, the read data memory 416 is capable of storing 16 individually-addressable 32-bit words of read data. However, the invention is not so limited, and the read data memory 416 is scalable to accommodate any desired amount of read data.

Figure 5:
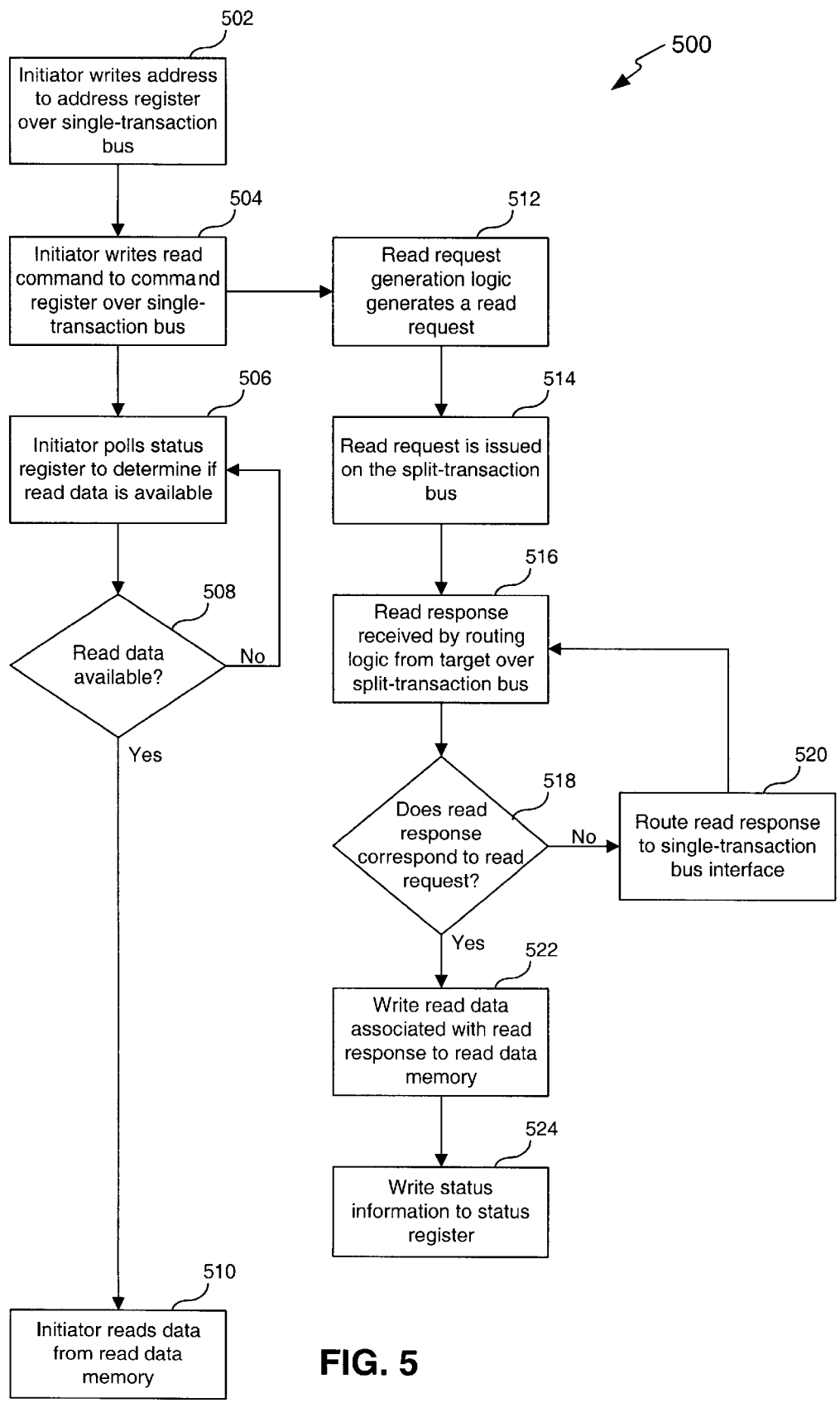
FIG. 5 depicts a flowchart of a method for conducting read data transfers in accordance with embodiments of the present invention.

D. Method for Executing Read Transactions in Accordance with Embodiments of the Present Invention FIG. 5 depicts a flowchart 500 of a method for conducting read data transfers between an initiator device on a single-transaction bus and a target device on a split-transaction bus in accordance with embodiments of the present invention. The invention, however, is not limited to the description provided by the flowchart 500. Rather, it will be apparent to persons skilled in the relevant art(s) from the teachings provided herein that other functional flows are within the scope and spirit of the present invention. The flowchart 500 will be described with continued reference to the single-transaction to split-transaction bus bridge application 300 of FIG. 3 and the posted read interface 310 previously described in reference to FIGS. 3 and 4.

The read data transfer begins at step 502 when the initiator device 302 writes address information to the address register 406 within the posted read interface 310 over the single-transaction bus 304. In embodiments, the address information specifies a read address corresponding to a target device on the split-transaction bus 308, which, for the purposes of the present example, is target device 306. At step 504, the initiator device 302 also writes command information to the command register 408 within the posted read interface 310 via the single-transaction bus 304. In embodiments, the command information comprises a read command. The process by which the initiator writes address information and command information to the address register 406 and the command register 408, respectively, may be termed a "posting a read."

In response to the writing of the command register 408, the read request generation logic 410 generates a read request for issuance on the split-transaction bus 308 as shown at step 512. In embodiments, the read request includes the previously-written address information from the address register 406, as well as a source identifier (ID) generated by the read request generation logic 410 that uniquely identifies the read request. The read request may also include other information derived from the command information in the command register 408, such as routing information, the amount of data to retrieve (e.g., a number of words of data to retrieve), and the like. At step 514, the read request is issued to the target device 306 on the split-transaction bus 308 via the split-transaction bus interface 404.

At step 516, a read response is received by the posted read interface 310 over the split-transaction bus 308 and is transferred to the read response routing logic 412. At step 518, the read response routing logic 412 receives the read response and determines if it corresponds to the read request issued in step 514. In embodiments, the read response routing logic 412 makes this determination by checking to see if the read response includes the same source ID as that included in the read request issued in step 514. If the read response does not correspond to the read request issued in step 514, then the read response is treated as a response to a regular read transaction on the single-transaction bus 304 (as opposed to a posted read) and is routed directly to the single-transaction bus interface 402, as shown in step 520.

If the read response corresponds to the read request issued in step 514, then the read data associated with the read response is stored in the read data memory 416 as shown in step 522. In embodiments, the read data is comprised of a series of words. In order to store the read data in the read data memory 416, the read data is received by the FIFO write control 414, which operates to generate values that identify storage addresses in the read data memory 416 and to store the read data at the identified addresses. In embodiments, as each word of the read data is received by the FIFO write control 414, the FIFO write control 414 generates an incrementing value that identifies an address within the read data memory 416 and stores the word to the identified address in a first-in-first-out fashion.

As indicated at step 524, the FIFO write control 414 also writes status information to the status register 418 that indicates that the read data has been stored in the read data memory 416 and is, therefore, directly available to devices on the single-transaction bus 304. This status information may comprise a single "posted read done" bit, which, when set, indicates that the requested read data is available in the read data memory 416. In embodiments, the FIFO write control 414 writes the status information to the status register 418 concurrently with the storing of the read data in the read data memory 416. In alternate embodiments, the FIFO write control 414 writes the status information to the status register 418 after it has stored the read data in the read data memory 416.

In accordance with embodiments of the present invention, while the posted read interface 310 retrieves and stores the requested read data as described in reference to steps 512, 514, 516, 518, 520, 522 and 524, above, the initiator device 302 is free to initiate other transactions on the single-transaction bus 304. This is because the initiator device 302 initiates the read data transfer by performing single-transaction writes to the address register 406 and the command register 408. Because writes are performed, the initiator device 302 is not occupied for the entire time it takes to extract the read data from the split-transaction bus, as it would be in the case of a conventional single-transaction read. Instead, the initiator device 302 is free to retrieve the requested read data from the read data memory 416 at some later point in time.

In the method depicted by flowchart 500, the initiator 302 polls the status register to determine if the read data is available at some point in time after writing to the command register 408, as shown at step 506. In embodiments, the polling may occur periodically at a predefined interval or, alternately, during periods when the initiator device 302 has sufficient available bandwidth. The polling may occur concurrently with any of steps 512, 514, 516, 518, 520, 522 and 524 as described above. As shown in step 508, if the read data is not available, then the polling process continues. However, if the read data is available, the initiator device 302 reads the read data directly from the read data memory 416, as shown at step 510, and the read data transfer is completed.

As discussed above, in embodiments, the read data memory 416 comprises a RAM that stores a specified number of individually-addressable words of read data that are directly accessible by the initiator device 302. In accordance with such embodiments, the initiator device 302 can access the words stored in the read data memory 416 in any order, read selected words, and skip undesired words. This presents a distinct advantage over, for example, a FIFO, in which each preceding word of data must be read in order to access a desired word of data.

Figure 6:
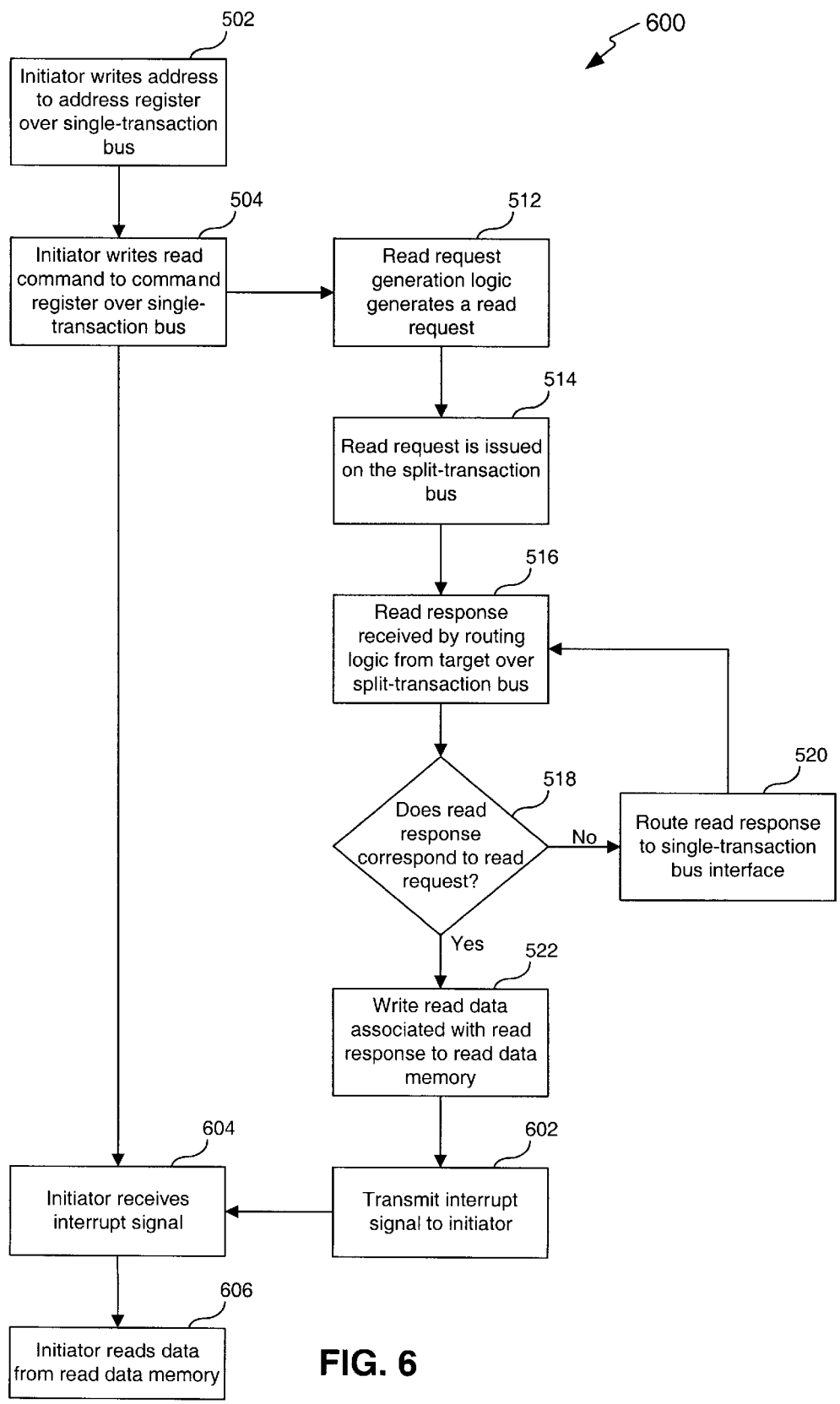
FIG. 6 depicts a flowchart of an alternate method for conducting read data transfers in accordance with embodiments of the present invention.

FIG. 6 depicts a flowchart 600 of an alternate method for conducting read data transfers between an initiator device on a single-transaction bus and a target device on a split-transaction bus in accordance with embodiments of the present invention. The method depicted in flowchart 600 is identical to that described in reference to the flowchart 500, above, except that an interrupt technique, as opposed to a polling technique, is used to alert the initiator device 302 to the presence of the requested read data in the read data memory 416.

In particular, after the requested read data has been stored in the read data memory 416, the FIFO write control 414 issues an interrupt signal to the initiator device 302 via the interrupt line 420 and the single-transaction bus interface 402, as shown at step 602. Upon receiving the interrupt signal at step 604, the initiator device 302 performs a direct read to the read data memory 416 to obtain the requested read data, thus completing the read transfer as shown in step 606.

While two techniques have been described herein for alerting the initiator device 302 to the presence of requested read data in the read data memory 416, it is expected that in most applications the polling technique described in reference to flowchart 500 will operate more efficiently than the interrupt technique described in reference to flowchart 600. This expectation is based on the fact that, in most systems, interrupts cause a context switch that entails register swapping and other data transfers that may substantially degrade overall system bandwidth.

Figure 7:
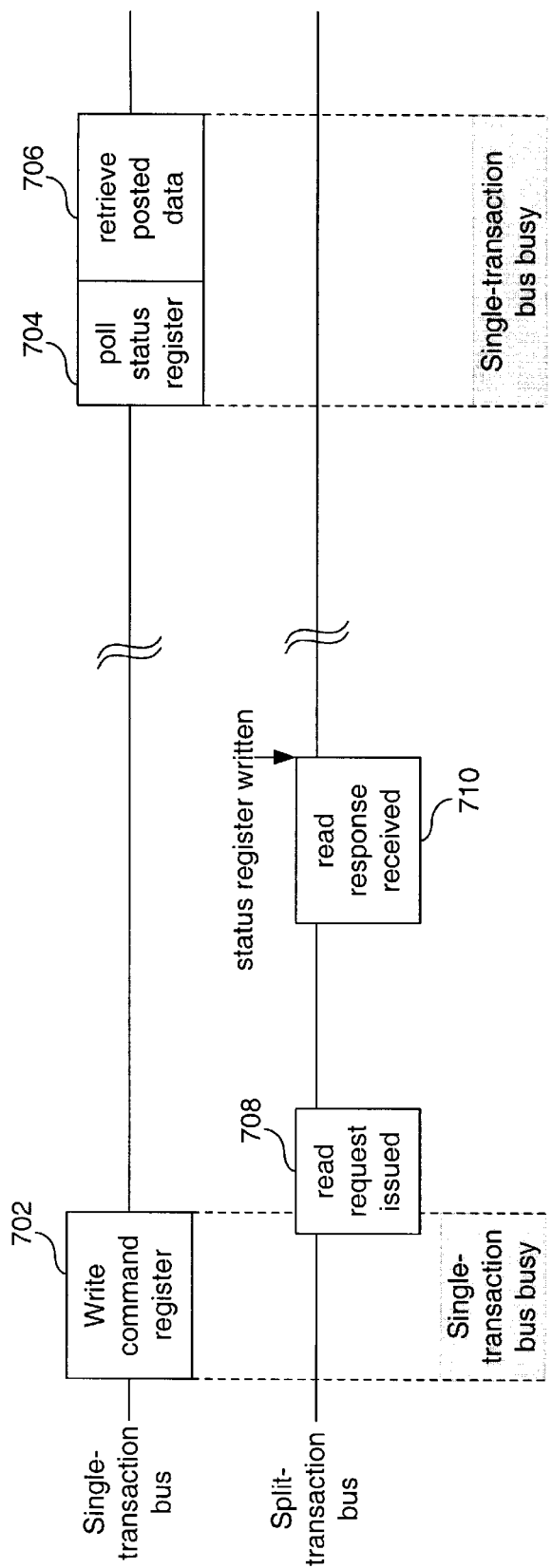
FIG. 7 illustrates latencies involved in conducting a read data transfer in accordance with embodiments of the present invention.

FIG. 7 illustrates the latency reduction that results from conducting a read data transfer in accordance with embodiments of the present invention. In particular, FIG. 7 shows the bus activity on the single-transaction bus 304 and the split-transaction bus 308 during a read data transfer in accordance with the method described above in reference to flowchart 500. As shown in block 702, the read data transfer is initiated when the initiator device 302 writes a read command to the command register 408 over the single-transaction bus 304. As shown in block 708, the writing of the command register causes the read request generation logic 410 to issue a read request on the split-transaction bus 308. Subsequently, a read response is received by the posted read interface 310 over the split-transaction bus 308, as depicted in block 710. Finally, at some later time, the initiator device 302 polls the status register 418 to determine if the requested read data is available, and, since the data is available, the initiator device 302 obtains the read data from the read data memory 416, as shown in blocks 704 and 706.

Figure 2:
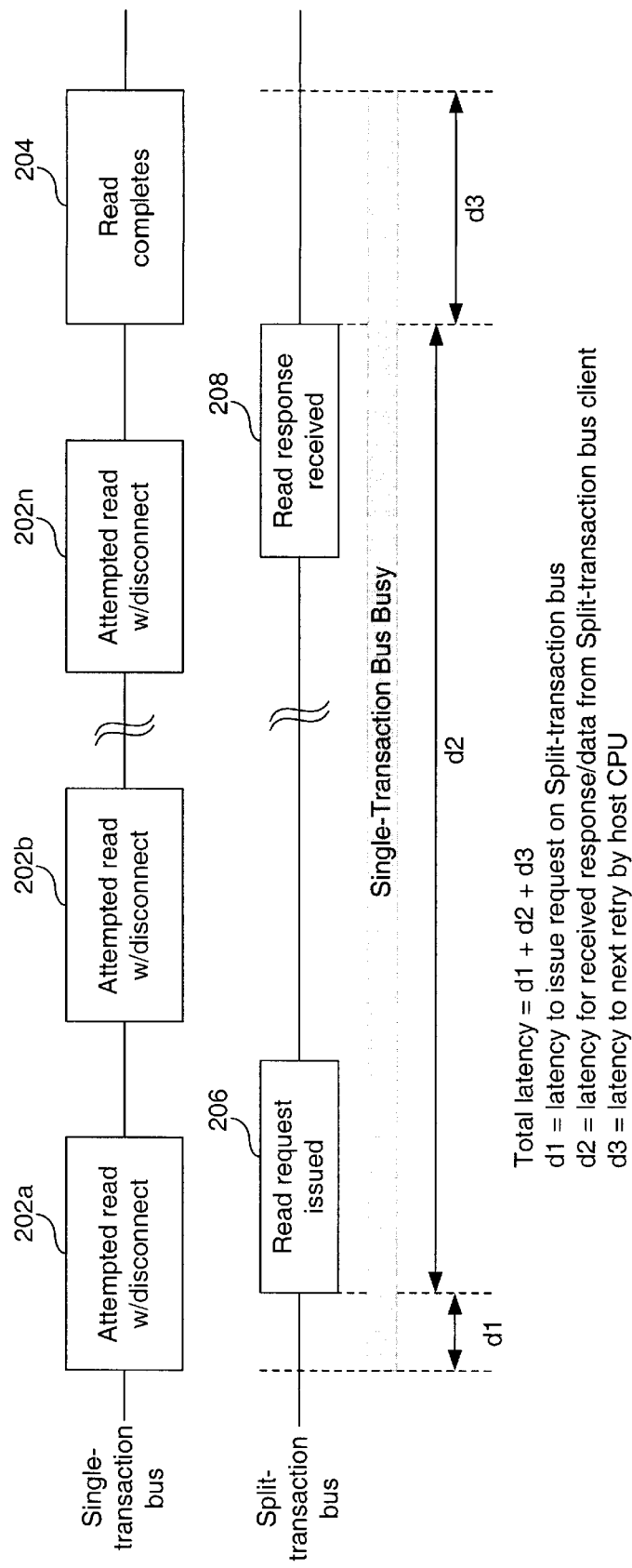
FIG. 2 illustrates potential latencies involved in conducting a read data transfer across a conventional single-transaction to split-transaction bus bridge.

As shown by FIG. 7, the total latency on the single-transaction bus 304 is equal only to the time required for the initiator device to write to the command register 408, to poll the status register 418, and to retrieve the requested data from the local memory 416 when it becomes available. Note that this latency is substantially less than that involved in conventional read transfers between a split-transaction and single-transaction bus, as described in reference to FIG. 2, above. This is due, in part, to the fact that no disconnects and retries are induced on the single-transaction bus 304. As a result, the initiator device 302 is free to handle other tasks in the system during the interval between the issuance of the read request and the scheduled polling of the status register 418.

E. Conclusion

While various embodiments of the present invention have been described above, it should be understood that they have been presented by way of example only, and not limitation. Alternate implementations are within the spirit and scope of the present invention. For example, FIG. 8 depicts an alternate embodiment of the posted read interface 310 of FIG. 4, denoted 310', that concurrently accommodates four posted reads rather than one This is achieved by utilizing four times the number of address registers, command registers, status registers, FIFO write controls, and read data memories as utilized in the posted read interface embodiment described above in reference to FIG. 4.

Figure 8:
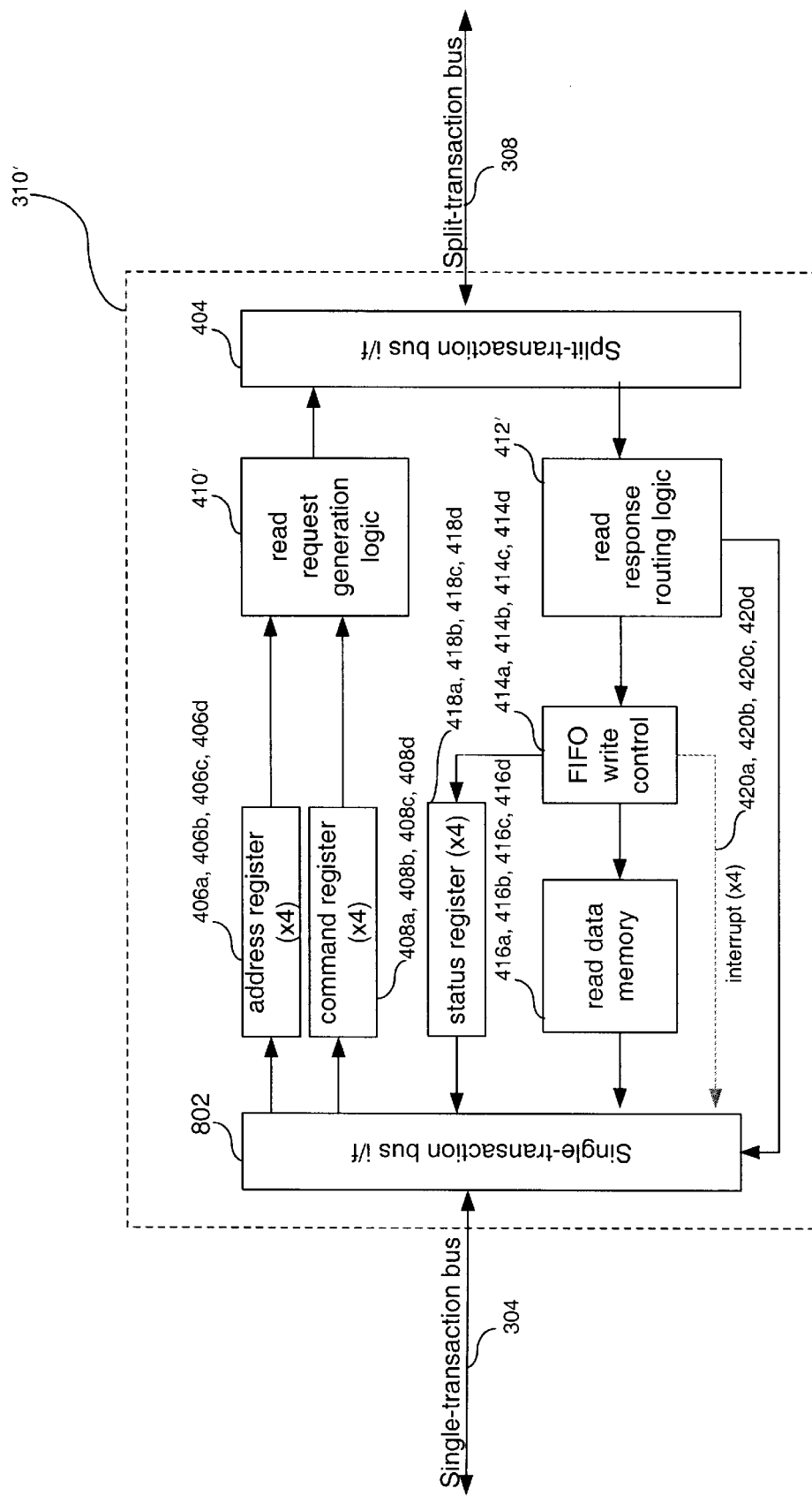
FIG. 8 depicts an interface between a split-transaction bus and a single-transaction bus in accordance with embodiments of the present invention.

In particular, the posted read interface 310' depicted in FIG. 8 includes four address registers 406a, 406b, 406c, and 406d and four corresponding command registers 418a, 418b, 418c, and 418d. Each address and command register pair supports a single posted read. The read request generation logic 410' generates and issues a separate read request in response to the population of each of the four command registers. The read request generation logic 410' also assigns a unique source ID to each of the four read requests so that responses to the requests may be properly routed by the read response routing logic 412'.

Upon receiving responses to the read requests, the read response routing logic 412' routes each response to one of four FIFO write controls 414a, 414b, 414c, 414d for storage to a corresponding one of four read data memories 416a, 416b, 416c, and 416d. Additionally, each FIFO write control writes to a corresponding one of four status registers 408a, 408b, 408c, 408d to indicate that requested data is available. Alternately, each FIFO may generate one of four interrupt signals 420a, 420b, 420c, and 420d to interrupt an initiator device to indicate that requested data is available.

As demonstrated by the above example, various changes in form and details may be made to the above-described embodiments without departing from the spirit and scope of the present invention as defined in the appended claims. Accordingly, the breadth and scope of the present invention should not be limited by any of the above-described exemplary embodiments, but should be defined only in accordance with the following claims and their equivalents.

What is claimed is:

1. An interface for conducting read data transfers between a single-transaction bus and a split-transaction bus, comprising:

a command register that is written to by an initiator device over the single-transaction bus;

read request generation logic that generates a read request and issues said read request over the split-transaction bus in response to the writing of command information to said command register by said initiator device;

a read data memory; and read response routing logic that receives a response to said read request from a target device over the split-transaction bus and routes read data associated with said response to said read data memory for storage in said read data memory;

wherein said read data stored in said read data memory is accessible to said initiator device over the single-transaction bus.

2. The interface of claim 1, wherein the single-transaction bus is a PCI bus.

3. The interface of claim 1, wherein said command information specifies a quantity of requested data words, and wherein said read request generated by said read request generation logic includes said specified quantity of requested data words.

4. The interface of claim 1, further comprising:
an address register that is written to by said initiator device over the single transaction bus;
wherein said read request generated by said read request generation logic includes address information written to said address register by said initiator device.

5. The interface of claim 1, wherein said read request generated by said read request generation logic includes a unique source identifier assigned by said read request generation logic, wherein said unique source identifier is included in said response to said read request and is used by said read response routing logic to route said read data associated with said response to said read data memory.

6. The interface of claim 1, wherein said read data memory comprises a random access memory.

7. The interface of claim 1, wherein said read data associated with said read response comprises one or more data words.

8. The interface of claim 7, further comprising:
write control logic that receives said read data associated with said response from said read response routing logic, and for each data word within said read data, generates a value corresponding to an address in said read data memory and stores said data word at said address in said read data memory.

9. The interface of claim 8, further comprising:
a status register;
wherein said write control logic writes status information to said status register in response to receiving said read data associated with said response, said status information indicating that said read data associated with said response is available in said read data memory.

10. The interface of claim 8, further comprising:
an interrupt line;
wherein said write control logic transmits an interrupt signal over said interrupt line in response to receiving said read data associated with said read response, said interrupt signal for alerting said initiator device that said read data associated with said response is available in said read data memory.

11. A method for conducting read data transfers between a single-transaction bus and a split-transaction bus, comprising:
writing a read command over the single-transaction bus;
generating a read request and issuing said read request over said split-transaction bus in response to said writing of said read command;
receiving a response to said read request over the split-transaction bus;
storing read data associated with said response in a memory in response to receiving said response; and
reading said read data from said memory over the single-transaction bus.

12. The method of claim 11, wherein the single-transaction bus is a PCI bus.

13. The method of claim 11, further comprising:
writing address information over the single transaction bus;
wherein said generating a read request comprises generating a read request that includes said address information.

14. The method of claim 11, wherein said read command specifies a quantity of requested data words, and said generating a read request comprises generating a read request that includes said specified quantity of requested data words.

15. The method of claim 11, wherein said generating a read request comprises generating a read request that includes a unique source identifier, wherein said unique source identifier is included in said response received over said split-transaction bus, and wherein said storing of said read data associated with said response comprises routing said read data to said memory based on said unique source identifier.

16. The method of claim 11, wherein said memory comprises a random access memory.

17. The method of claim 11, wherein said read data comprises one or more data words and said storing said read data in said memory comprises storing said one or more data words in said memory.

18. The method of claim 17, wherein said storing one or more data words in said memory comprises, for each data word, generating a value corresponding to an address in said memory and storing said data word at said address in said memory.

19. The method of claim 11, further comprising polling a status register over the single-transaction bus to determine if said read data associated with said response is stored in said memory.

20. The method of claim 11, further comprising issuing an interrupt signal over said single-transaction bus to indicate that said read data associated with said read response has been stored in said memory.

21. A method for conducting read data transfers between a single-transaction bus and a split-transaction bus, comprising:
generating a read request and issuing said read request over said split-transaction bus in response to the writing of a read command by an initiator device over the single-transaction bus;
receiving a response to said read request from a target device over the split-transaction bus;
storing read data associated with said response in a memory in response to receiving said response, said memory being read accessible to said initiator device on the single-transaction bus.

22. The method of claim 21, wherein the single-transaction bus is a PCI bus.

23. The method of claim 21, wherein said generating a read request comprises generating a read request that includes address information written by said initiator device over the single-transaction bus.

24. The method of claim 21, wherein said read command specifies a quantity of requested data words, and said generating a read request comprises generating a read request that includes said specified quantity of requested data words.

25. The method of claim 21, wherein said generating a read request comprises generating a read request that includes a unique source identifier, wherein said unique source identifier is included in said response received over said split-transaction bus, and wherein said storing of said read data associated with said response comprises routing said read data to said memory based on said unique source identifier.

26. The method of claim 21, wherein said memory comprises a random access memory.

27. The method of claim 21, wherein said read data comprises one or more data words and said storing said read data in said memory comprises storing said one or more data words in said memory.

28. The method of claim 27, wherein said storing one or more data words in said memory comprises, for each data word, generating a value corresponding to an address in said memory and storing said data word at said address in said memory.

29. The method of claim 21, further comprising receiving a polling request over the single-transaction bus to determine if said read data associated with said response is stored in said memory.

30. The method of claim 21, further comprising issuing an interrupt signal over said single-transaction bus to indicate that said read data associated with said read response has been stored in said memory.

* * * * *

UNITED STATES PATENT AND TRADEMARK OFFICE
CERTIFICATE OF CORRECTION

PATENT NO. : 6,766,386 B2
DATED : July 20, 2004
INVENTOR(S) : William Gordon Keith Dobson It is certified that error appears in the above-identified patent and that said Letters Patent is hereby corrected as shown below:

Title page,
Item [56], References Cited, OTHER PUBLICATIONS,
-- PCI Special Interest Group, PCI-to-PCI Bridge Architecture Specification, Revision 1.1 (December 18, 1998), 148 pages
  PCI Special Interest Group, PCI Local Bus Specification, Revision 2.2 (December 18, 1998), 303 pages --.

Signed and Sealed this

Twenty-second Day of February, 2005

JON W. DUDAS
*Director of the United States Patent and Trademark Office*